US007383383B1

(12) United States Patent
Bandopadhyay et al.

(10) Patent No.: US 7,383,383 B1
(45) Date of Patent: *Jun. 3, 2008

(54) SYSTEM AND METHOD FOR PROVIDING HIGHLY-AVAILABLE VOLUME MOUNT POINTS

(75) Inventors: Tushar Bandopadhyay, Pune (IN); Mangesh D. Pangarkar, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 554 days.

This patent is subject to a terminal disclaimer.

(21) Appl. No.: 10/930,542

(22) Filed: Aug. 31, 2004

Related U.S. Application Data

(63) Continuation of application No. 10/324,810, filed on Dec. 20, 2002, now Pat. No. 6,865,597.

(51) Int. Cl.
*G06F 12/00* (2006.01)
(52) U.S. Cl. ...................... 711/114; 711/147
(58) Field of Classification Search ............... 711/114, 711/147, 154
See application file for complete search history.

(56) References Cited

U.S. PATENT DOCUMENTS

| 5,287,453 | A | 2/1994 | Roberts | 395/200 |
|---|---|---|---|---|
| 6,119,131 | A | 9/2000 | Cabrera | 707/203 |
| 6,125,373 | A | 9/2000 | Momoh et al. | 707/205 |
| 6,393,485 | B1 | 5/2002 | Chao et al. | 709/231 |
| 6,591,356 | B2 | 7/2003 | McMurdie et al. | 711/206 |
| 2003/0018927 | A1 | 1/2003 | Gadir et al. | 714/4 |

*Primary Examiner*—Brian R. Peugh
(74) *Attorney, Agent, or Firm*—Campbell Stephenson LLP (57) ABSTRACT

A system and method for providing highly-available volume mount points is disclosed. According to one embodiment, in a system including a shared storage resource coupled to a server cluster and accessible by a node of said server cluster, a volume mount point is provided within the shared storage resource. According to another embodiment, the shared storage resource includes a base volume and a target volume and a volume mount point corresponding to the target volume is provided within the base volume. A first mount is configured corresponding to the target volume and a mount order dependency relationship is defined between the first mount and a second mount corresponding to the base volume. Embodiments of the present invention may be used to ensure that a new (secondary) node accesses a shared disk or volume in the same way it was accessed before a transition event (e.g., failover or switchover).

19 Claims, 8 Drawing Sheets

SYSTEM AND METHOD FOR PROVIDING HIGHLY-AVAILABLE VOLUME MOUNT POINTS

CROSS-REFERENCE TO RELATED APPLICATIONS

The present patent application is a continuation of U.S. patent application Ser. No. 10/324,810, filed on Dec. 20, 2002, now U.S. Pat. No. 6,865,597, entitled "System and Method for Providing Highly-Available Volume Mount Points" incorporated by reference herein in its entirety and for all purposes.

BACKGROUND OF THE INVENTION

1. Technical Field

The present invention relates generally to data storage. More particularly, the present invention relates to a system and method for providing highly-available volume mount points.

2. Description of Related Art

Companies today rely to an unprecedented extent on online, frequently accessed, constantly changing data to run their businesses. Unplanned events that inhibit the availability of data and applications can seriously damage business operations. Therefore, when disaster strikes, companies must be prepared to eliminate or minimize data loss, and recover quickly using alternate resources.

Clustering is a strategy wherein data processing systems and storage devices are interconnected, typically at high speeds within a site, for the purpose of improving reliability, availability, serviceability, and/or performance via load balancing and/or transition in the event of a failover or switchover condition. Such transitions may take place as a result of administrator intervention (e.g., for maintenance or load distribution) or automatic selection for load distribution and balancing (switchover), and/or due to a failure of an active or primary node (failover). Redundant interconnections between the data processing systems or "nodes" are typically included as well, and the collection of data processing systems, storage devices, and redundant interconnections is referred to herein as a server cluster. The server cluster appears to users as a single highly-available system.

Nodes within a cluster often use a common pool of storage devices, with the purpose of the cluster being to provide alternative processing resource(s) for the data on the shared storage resources (e.g., disks, plexes, volumes, etc.) following a transition between nodes. Only one of the nodes in the cluster generally provides processing resources with respect to a particular software application at a time. The system currently providing processing resources in the cluster for a particular software application is referred to herein as a primary node, and other systems in the cluster are referred to herein as secondary nodes. The terms "primary node" and "secondary node" are used in the context of a particular software application, such that a primary node for one application may serve as a secondary node for another application, and a secondary node for a third application may serve as a primary node for yet another application.

Each server cluster typically runs a software application to coordinate the activities of the nodes within the cluster. This software is referred to herein as a cluster manager, cluster management application, or "cluster server". A cluster server may monitor the health of sites in a distributed server cluster system and restart an application on another node when the node running the application fails. Typically, cluster management functions are limited to such clustering operations as monitoring, starting, and stopping resources.

Using prior versions of Microsoft's Windows® operating system (e.g., Windows® 3.x, Windows® 95, Windows® 98, etc.) volumes within shared storage were accessed using drive letters (a-z). Because of drive letters required for the floppy drive, a system/boot volume, and a CDROM, nodes were limited to being able to access only up to 23 volumes. This limitation was removed from Windows® 2000 onwards by adding support for volume mount points. A volume mount point is directory or folder within the Windows® namespace (e.g., a directory or "folder") of a volume which represents another volume in a persistent, robust manner, thus eliminating the need to assign a drive letter to each volume and allowing system administrators to transcend the previous 23 volume/drive limitation. Using volume mount points causes a node's storage subsystem to transparently resolve accesses of volume mount point directories or folders within a "base" volume to the root of a specified "target" volume.

Volume mount points allow storage to be made scalable and easily manageable and accordingly support for such volume mount points within a highly-available/server cluster environment is desirable. Several characteristics of volume mount points make them particularly difficult to implement in a cluster environment. For example, a target volume may become inaccessible due to the inaccessibility of its base volume, or because the target's base volume isn't accessible using the same access path across nodes of a server cluster or the same node following a system shutdown, restart, or administrative change. Accordingly, conventional server cluster systems do not provide support for volume mount points within shared storage resources such as those of cluster server environments.

SUMMARY OF THE INVENTION

Disclosed is a system and method for providing highly-available volume mount points. Embodiments of the present invention may be used to ensure that a new (secondary or "backup") node within a server cluster accesses a disk or volume in the same way it was accessed before a transition event (e.g., a failover or switchover) occurred.

According to one embodiment, in a system including a shared storage resource coupled to a server cluster and accessible by a node of said server cluster, a volume mount point is provided within the shared storage resource.

According to another embodiment, the shared storage resource includes a base volume and a target volume and a volume mount point corresponding to the target volume is provided within the base volume. A first mount is configured corresponding to the target volume and a mount order dependency relationship is defined between the first mount and a second mount corresponding to the base volume.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings in which.

The use of the same reference symbols in different drawings indicates similar or identical items.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" means that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
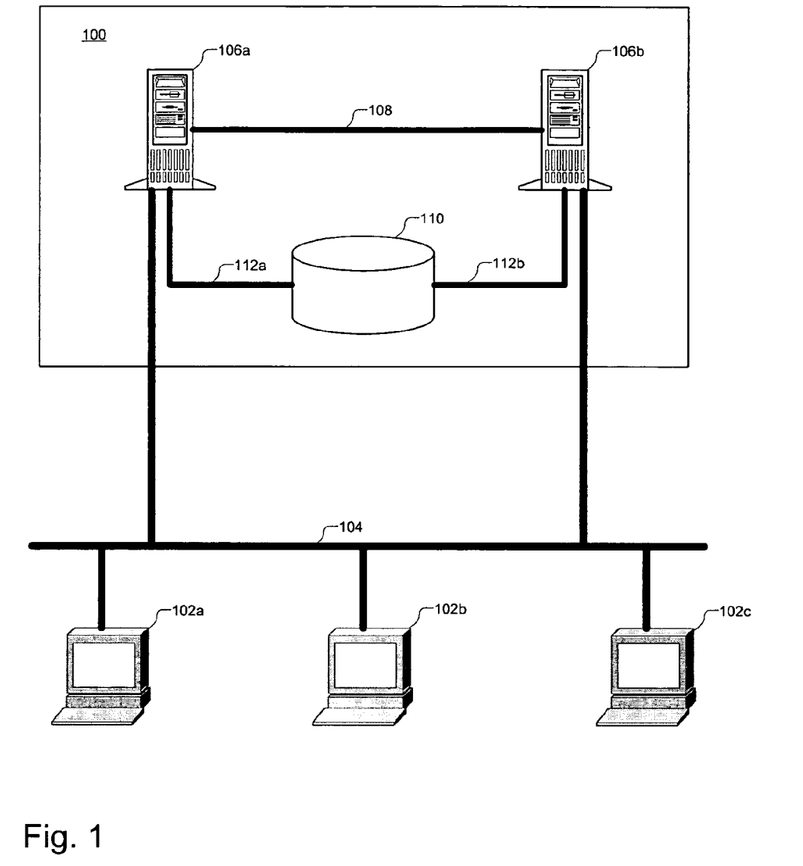
FIG. 1 illustrates an exemplary server cluster system according to an embodiment of the present invention.

FIG. 1 illustrates an exemplary server cluster system according to an embodiment of the present invention. The server cluster system of the illustrate embodiment includes a server cluster 100 coupled to one or more clients 102 via a communications network 104 (e.g., an IP network, LAN or WAN). Server cluster 100 includes a primary node 106a and a secondary node 106b coupled together using a redundant cluster connection 108 and to a shared storage resource 110 (e.g., a fibre channel RAID storage array) using interconnections 112a and 112b, respectively. Although only two nodes have been depicted within cluster 100, a greater number of nodes may be included in various alternative embodiments of the present invention. Cluster 100 may be utilized for load balancing, distribution, and/or transition protection in the event of failover or switchover. When utilized for failover protection, various failover configurations may be implemented according to alternative embodiments of the present invention including asymmetric, symmetric, n-to-1, n+1, and/or n-to-n.

In the exemplary embodiment of FIG. 1, nodes 106a and 106 are configured as failover servers for the same application (e.g., a cluster-aware database application) and shared storage resource comprises one or more shared disks, disk arrays, and/or disk groups coupled to the cluster either via one or more host data processing systems or a Storage Attached Network (SAN). Redundant cluster connection 108 provides a private communications network between primary node 106a and secondary node 106b utilized according to one embodiment for cluster management and operation. For example, redundant cluster connection comprises redundant heartbeat private network connections via crossover cables between redundant network interface cards (NICs) according to one embodiment which enable failover software within a node to recognize when a failure has occurred. When more than two nodes make up the server cluster, the private network connection provided by redundant cluster connection 106 may utilize a hub.

According to another embodiment of the present invention, shared storage resource 110 includes a target volume and a base volume including a volume mount point associated with the target volume as further described herein. Server cluster 100 of the described embodiment further includes a mount which may be utilized by primary node 106a and/or secondary node 106b to mount and access data within the described target volume.

Figure 2:
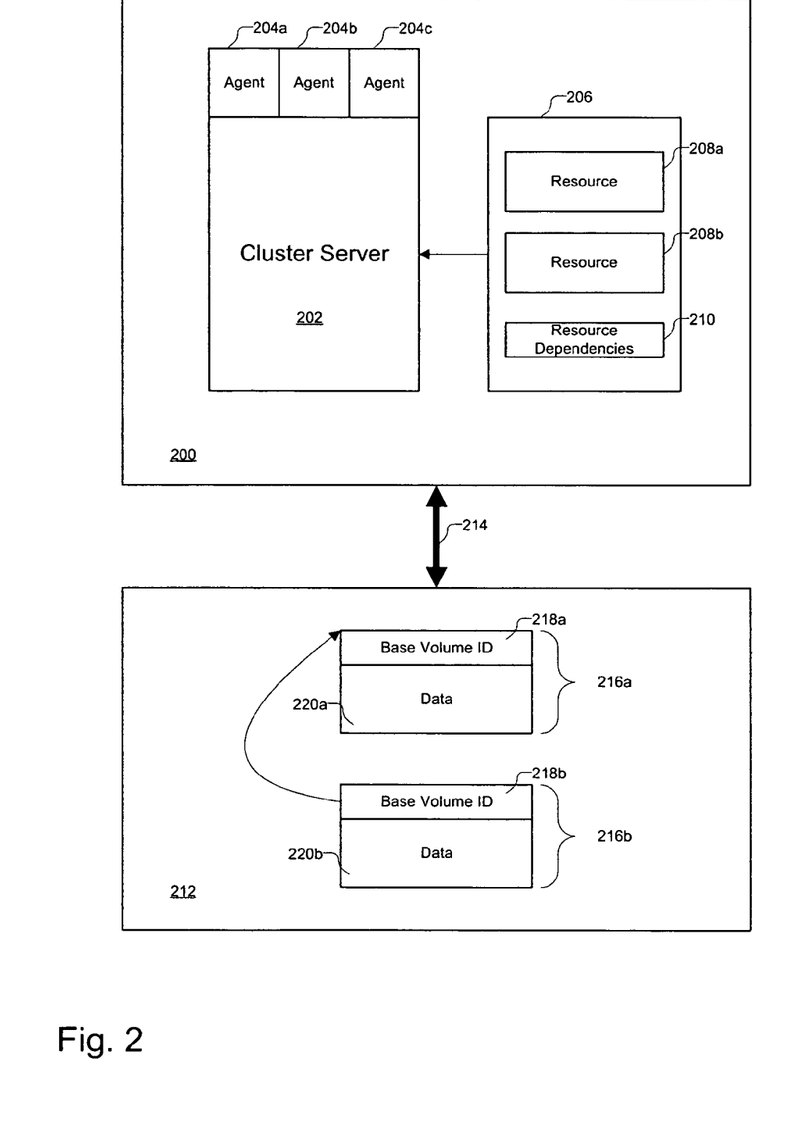
FIG. 2 illustrates a functional block diagram of a server cluster node and shared storage resource within a server cluster environment according to an embodiment of the present invention.

FIG. 2 illustrates a functional block diagram of a server cluster node and shared storage resource within a server cluster environment according to an embodiment of the present invention. Clustering functionality may be provided using any combination of hardware, firmware, and/or software (e.g., VERITAS® Global Cluster Manager™, VERITAS® Cluster Server™, Hewlett-Packard® MC/Service Guard, Microsoft® Cluster Server, or the like). While the embodiment of FIG. 2 has been illustrated and described with respect to a particular architecture, it should be appreciated that any cluster software, hardware, or firmware architecture may be similarly adapted within one or more alternative embodiments of the present invention.

Node 200 (such as primary node 106a or secondary node 106b of FIG. 1) of the illustrated embodiment includes a cluster server 202 having one or more associated agents 204 and configuration data 206 including one or more cluster resources such as mounts 208a and 208b and one or more resource dependency definitions 210 as shown. Node 200 is communicatively coupled to a shared storage resource 212 such as shared storage resource 110 of FIG. 1 utilizing a communication link 214. Shared storage resource 212 of the illustrated embodiment includes a base volume 216a and a target volume 216b.

Each volume 216 in turn stores data 220 and base volume ID information 218 about its base volume (e.g., the volume on which it is mounted for volume mount point mounts) as a combination of the base volume's volume ID and the path of the volume mount point folder relative to the base volume's root. Each volume ID is typically expressed as a DOS device name (e.g., \??\Volume{GUID}). Accordingly, if base volume 216a, including a folder "Mount1" acting as a volume mount point for target volume 216b, has a volume ID \??\Volume{333B53FD-8034-4f2a-A700-FE4AB6246587}, base volume ID information 218b of target volume 216b would store the combination "\??\Volume{333B53FD-8034-4f2a-A700-FE4AB6246587} \Mount1". Base volume 216a would in turn store base volume ID information 218a indicating a drive letter mount or another volume mount point, depending on how it was mounted.

According to one embodiment of the present invention, a VERITAS® Cluster Server™ (VCS) environment is provided which may include one or more clusters, resources, service groups, agents, and communication facilities.

A VCS cluster consists of two or more nodes connected in various combinations to shared storage devices. All nodes within a cluster share a cluster ID, and are connected by redundant private networks over which they communicate by heartbeats, signals sent periodically from one system to another as previously described with respect to FIG. 1. Applications can be configured to run on specific nodes within a cluster. Storage is configured to provide access to shared data for nodes hosting an application, so storage connectivity determines where applications are run. A cluster can be managed from a command-line or graphical-user interface.

Resources are hardware or software entities, such as network interface cards (NICs), IP addresses, applications, databases, volume mounts, etc. that are brought online, taken offline, and/or monitored by VCS. Each resource is identified by a unique name. Resources with similar characteristics are known collectively as a resource type; for example, two IP resources are both classified as type IP. How VCS starts, stops, and monitors a resource is specific to the resource type. According to one embodiment of the present invention, mount and mountv resource types are provided describing mounts on volumes within basic disks configured and controlled using Logical Disk Manager (LDM) and a mounts on volumes within dynamic disks configured and controlled using VERITAS® Volume Manager™, respectively.

A service group is a group of one or more applications and associated resources used to improve the granularity for managing transitions with a server cluster. For example, a service group for a Web application may consist of: a hard disk or VERITAS® Volume Manager™ (VxVM) disk group, a drive letter for the partition or volume on the hard disk, one or more network interface cards to export the Web service, one or more IP addresses associated with the network cards, the application program and associated code libraries. A failover transition may be performed at a service group level rather than a node or server level. VCS performs administrative operations on resources at the service group level, including starting, stopping, restarting, and monitoring. Accordingly, when a service group is brought online, all enabled resources within the group are also brought online. When a failover occurs in VCS, the entire service group containing a resource fails over as a unit rather than the resource individually.

Resources within a service group have dependencies. Some resources must be operational before other resources can become operational. When a service group is brought online or taken offline, the resource dependencies within the group specify the order in which the resources are brought online and taken offline. For example, a VxVM disk group is imported before volumes within the disk group are assigned drive letters. Conversely, the volumes' drive letters must be unassigned before the disk group is exported.

Resources may therefore be categorized as parents or children, depending on how they are configured. Diagramming the relationship between them forms a graph. With parent resources appearing at the top of "arcs" that connect them to their child resources. Typically, child resources are brought online before parent resources, and parent resources are taken offline before child resources. According to another embodiment of the present invention, a resource (e.g., a volume mount) may be made dependent on another specific resource. VCS includes a language for specifying or defining resource types and dependency relationships.

An agent is a program designed to control resources of a particular resource type. VCS includes a set of predefined resource types, and each has a corresponding agent, designed to control the resource. There is one agent for each resource type. Agents control resources according to information hardcoded into the agent itself, or by running scripts. Agents act as the "intermediary" between a resource and VCS. The agent recognizes the resource requirements and communicates them to VCS. For example, mount and mountv agents are utilized to mount a volume on a specified mount point, unmount a volume from a mount point, and monitor the health or condition of a mount point.

Figure 3:
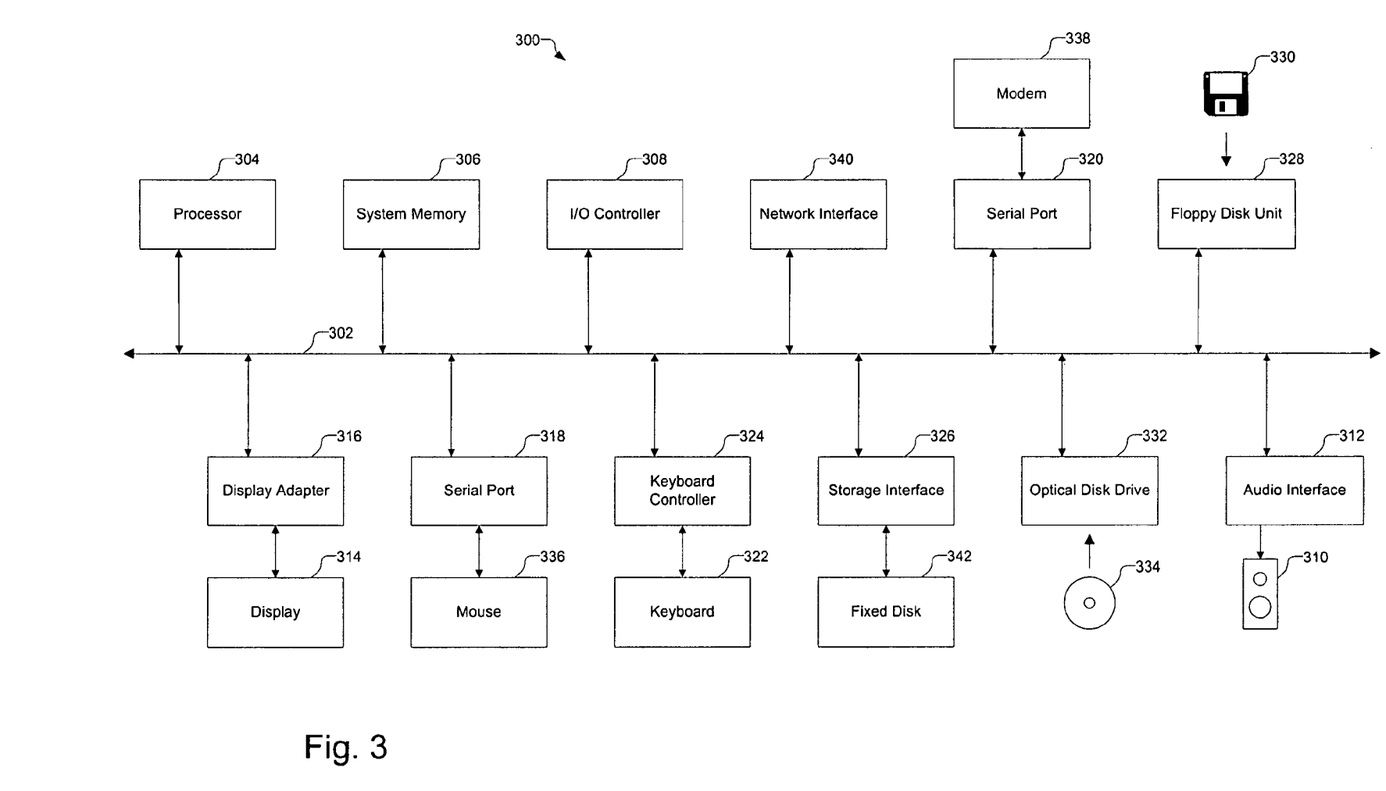
FIG. 3 illustrates an exemplary primary and/or secondary node system block diagram useable with one or more embodiments of the present invention.

FIG. 3 illustrates an exemplary primary and/or secondary node system block diagram useable with one or more embodiments of the present invention. Computer system 300 includes a bus 302 which interconnects major subsystems of computer system 300 such as a central processor 304, a system memory 306 (typically RAM, but which may also include ROM, flash RAM, or the like), an input/output controller 308, an external audio device such as a speaker system 310 via an audio output interface 312, an external device such as a display screen 314 via display adapter 316, serial ports 28 and 30, a keyboard 322 (interfaced with a keyboard controller 324), a storage interface 326, a floppy disk drive 36 operative to receive a floppy disk 330, and a CD-ROM drive 332 operative to receive a CD-ROM 334. Also included are a mouse 336 (or other point-and-click device, coupled to bus 302 via serial port 318), a modem 338 (coupled to bus 302 via serial port 320) and a network interface 340 (coupled directly to bus 302).

Bus 302 allows data communication between central processor 304 and system memory 306, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 300 are generally stored on and accessed via a computer readable medium, such as a hard disk drive (e.g., fixed disk 342), an optical drive (e.g., CD-ROM drive 332), floppy disk unit 328 or other storage medium. Additionally, applications may be in the form of electronic signals modulated in accordance with the application and data communication technology when accessed via network modem 338 or interface 340.

Storage interface 326, as with the other storage interfaces of computer system 300, may connect to a standard computer readable medium for storage and/or retrieval of information, such as a fixed disk drive 342. Fixed disk drive 342 may be a part of computer system 300 or may be separate and accessed through other interface systems. Many other devices can be connected such as a mouse 336 connected to bus 302 via serial port 318, a modem 338 connected to bus 302 via serial port 320 and a network interface 340 connected directly to bus 302. Modem 338 may provide a direct connection to a remote server via a telephone link or to the Internet via an internet service provider (ISP). Network interface 340 may provide a direct connection to a remote server via a direct network link to the Internet via a POP (point of presence). Network interface 340 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 3 to be present to practice the present invention. The devices and subsystems may be interconnected in different ways from that shown in FIG. 3. The operation of a computer system such as that shown in FIG. 3 is readily known in the art and is not discussed in detail in this application. Code to implement the present invention may be stored in computer-readable storage media such as one or more of system memory 306, fixed disk 342, CD-ROM 334, or floppy disk 330. Additionally, computer system 300 may be any kind of computing device, and so includes personal data assistants (PDAs), network appliances, X-window terminals or other such computing devices. The operating system provided on computer system 300 may be MS-DOS®, MS-WINDOWS®, OS/2®, UNIX®, Linux® or other known operating system. Computer system 300 also supports a number of Internet access tools, including, for example, an HTTP-compliant web browser.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above-described embodiment are characterized as transmitted from one block or element to the next, other embodiments of the present invention may include modified signals in place of such directly transmitted signals as long as the informational and/or functional aspect of the signal is transmitted.

Figure 4:
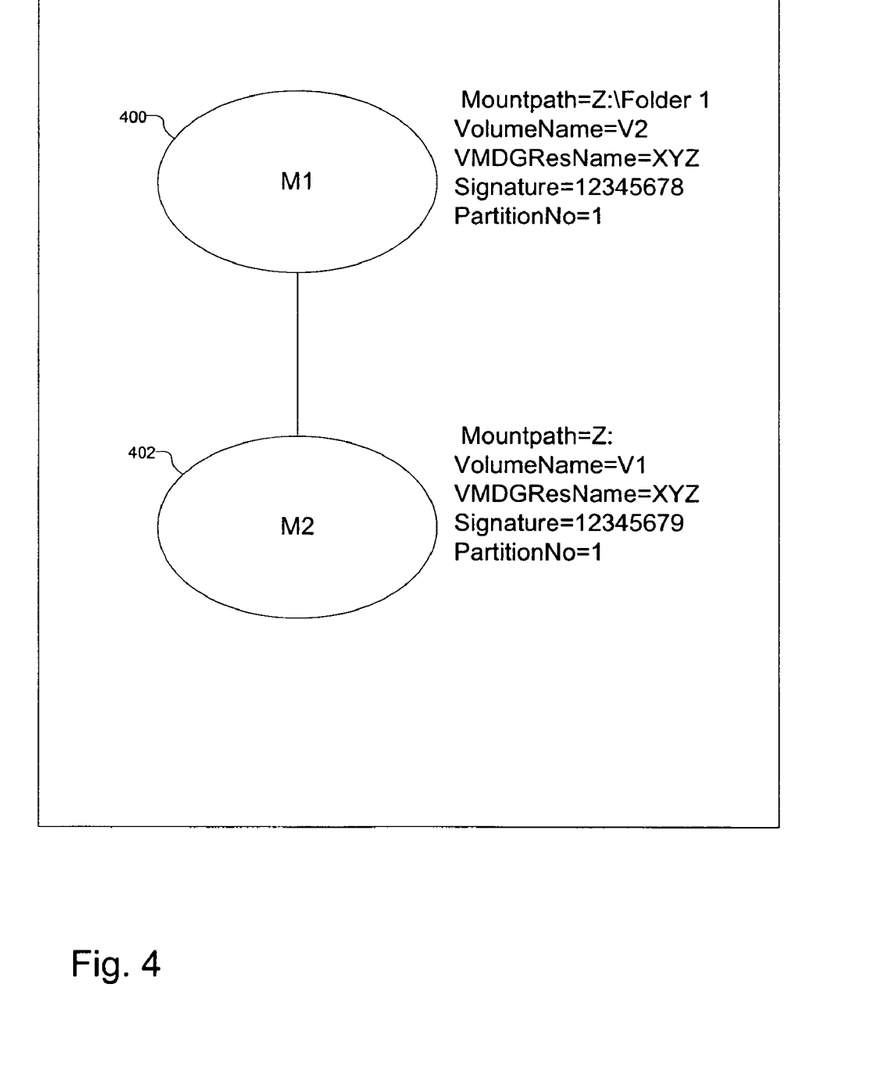
FIG. 4 illustrates a volume mount architecture for supporting a volume mount point according to an embodiment of the present invention.

FIG. 4 illustrates a volume mount architecture for supporting a volume mount point according to an embodiment of the present invention. The depicted architecture includes a first mount 400, "M1" corresponding to a target volume such as target volume 216b of FIG. 2 and a second mount 402, "M2" corresponding to a base volume such as base volume 216a of FIG. 2. According to one embodiment, the described volume mount architecture is implemented as configuration data (e.g., a configuration data 206 of FIG. 2) within a server cluster. First mount 400 and second mount 402 each has a number of associated attributes. In the illustrated embodiment, each mount includes a mountpath attribute, a volume name attribute, a VERITAS® Volume Manager™ disk group resource name (VMDGResName), a signature, and a partition number.

In the embodiment depicted in FIG. 4, mountpath specifies the drive letter or path to an empty folder that will be assigned to the volume being mounted, volume name specifies the name of the volume to be mounted (e.g., Raid1, Stripe2, Volume01, etc.), VMDGResName specifies the name of the Volume Manager™ (VMDg) resource on which a MountV resource depends, signature specifies a system-specified disk identifier, and partition number specifies the partition on the disk configured for mounting. In one embodiment the base index for the partition number is 1 and the default value is 0. In an alternative embodiment of the present invention, only signature and partition number attributes are used for resources of type "mount" while only volume name and VMDGResName attributes are used for "mountv" resources.

In the illustrated embodiment of FIG. 4, the first mount and the second mount are associated using both their mountpath attributes and a mount order dependency relationship (not illustrated) which is defined elsewhere in the volume mount architecture, for example, within resource dependency definitions 210 of configuration data 206. To ensure that the base volume corresponding to second mount 402 is mounted before the target volume corresponding to first mount 400, resource dependency is defined such that resources of the same type (e.g., mount) may depend from one another. Mount 400 is of type "volume mount point" where MountPath attribute points to a directory of the base volume. The mountpath attribute combined with the volume name (for MountV resources) or the partition number and disk signature (for Mount resources) uniquely identifies the mount. Mount 402 is of type "drive letter" which ensures that the whole "volume mount point" infrastructure is in place. According to the illustrated embodiment of the present invention, the mount order dependency relationship is defined as "M1 requires M2".

Figure 5:
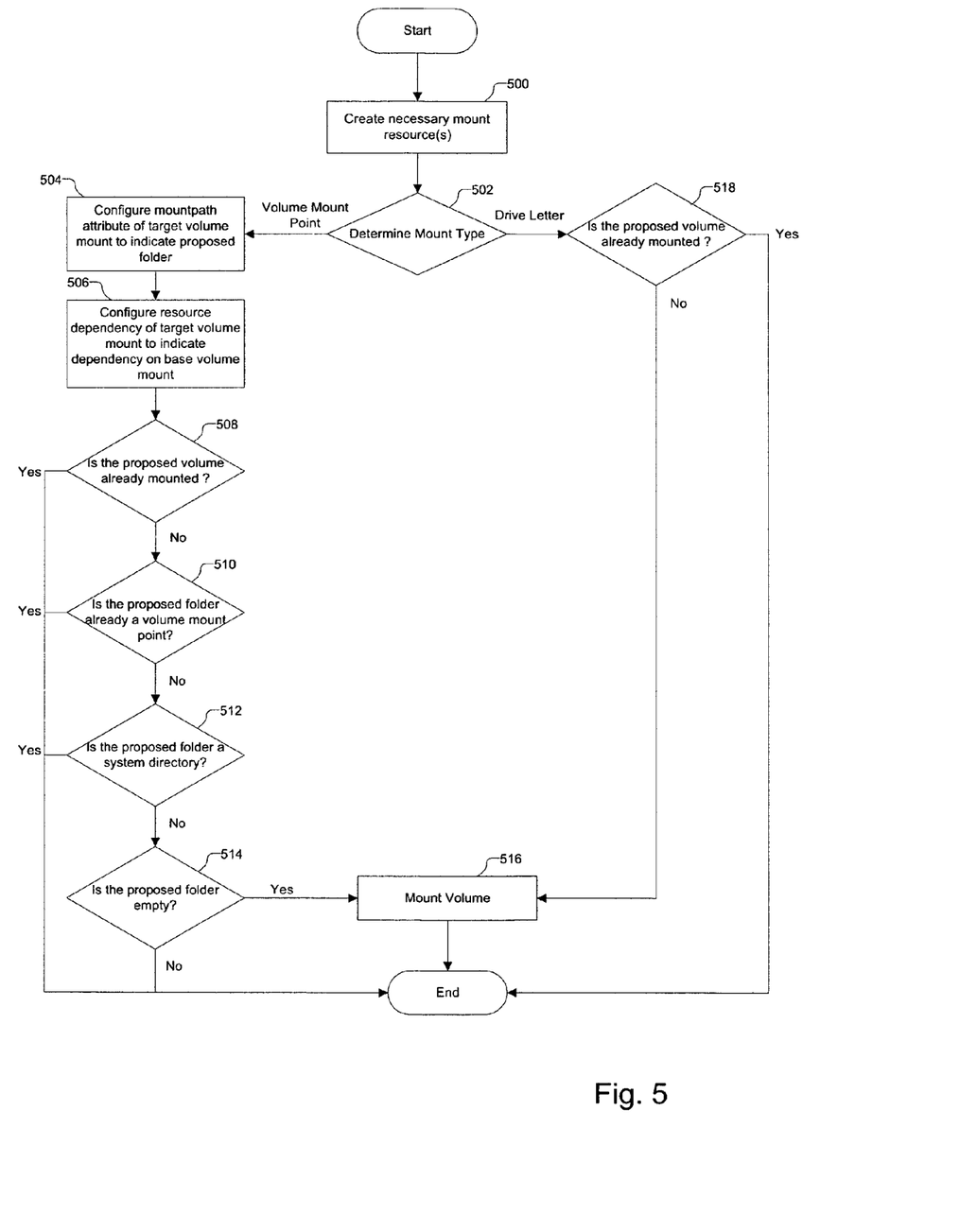
FIG. 5 illustrates a volume mount process according to an embodiment of the present invention.

FIG. 5 illustrates a volume mount process according to an embodiment of the present invention. In the illustrated process embodiment, resources necessary for providing the described volumes and mounts are first created (process block 500) and then a determination is made which mount type is to be performed (process block 502). If a volume mount point mount is to be performed, a mountpath attribute of a target volume mount is configured to indicate the proposed folder for the volume mount point (process block 504) and the target volume mount's resource dependency is configured or defined to indicate the target volume mount's dependency on a base volume mount (process block 506).

Thereafter determinations are made whether the proposed volume has already been mounted (process block 508), whether the proposed folder is already being used as a volume mount point (process block 510), whether the proposed folder is a system directory (process block 512), and whether the proposed folder is empty (process block 514). If a determination is made that the proposed volume is already mounted, or that the proposed folder is already a volume mount point, is a system directory, or isn't empty the illustrated process is terminated. Otherwise, the volume is mounted (process block 516) prior to the termination of the described process. Once the volume has been mounted, all other conventional functionality (volume access, filesystem checks, cleaning, etc.) may also be provided.

If a drive letter mount is to be performed, a determination is made whether the proposed volume has already been mounted (process block 518) either as a volume mount point or a drive letter. If a mount of the proposed volume already exists, the described process is terminated to avoid having multiple paths to or mounts of a single volume and to maintain a single point of control of storage resources within the server cluster. If a determination is made that no mount exists for the proposed volume, the volume is mounted (process block 516) and thereafter the illustrated process ends.

While a particular order of operation has been illustrated and described with respect to FIG. 5, it should be appreciated that in alternative embodiments of the present invention that the order of the depicted process elements may be varied and/or the process elements may be consolidated or separated into a greater or lesser number of elements. Similarly, the described process elements may be performed by any of a number of entities. (e.g., performed as guidelines or restrictions during resource configuration and/or performed using one or more associated agents such as those described with respect to FIG. 2).

Figure 6A:
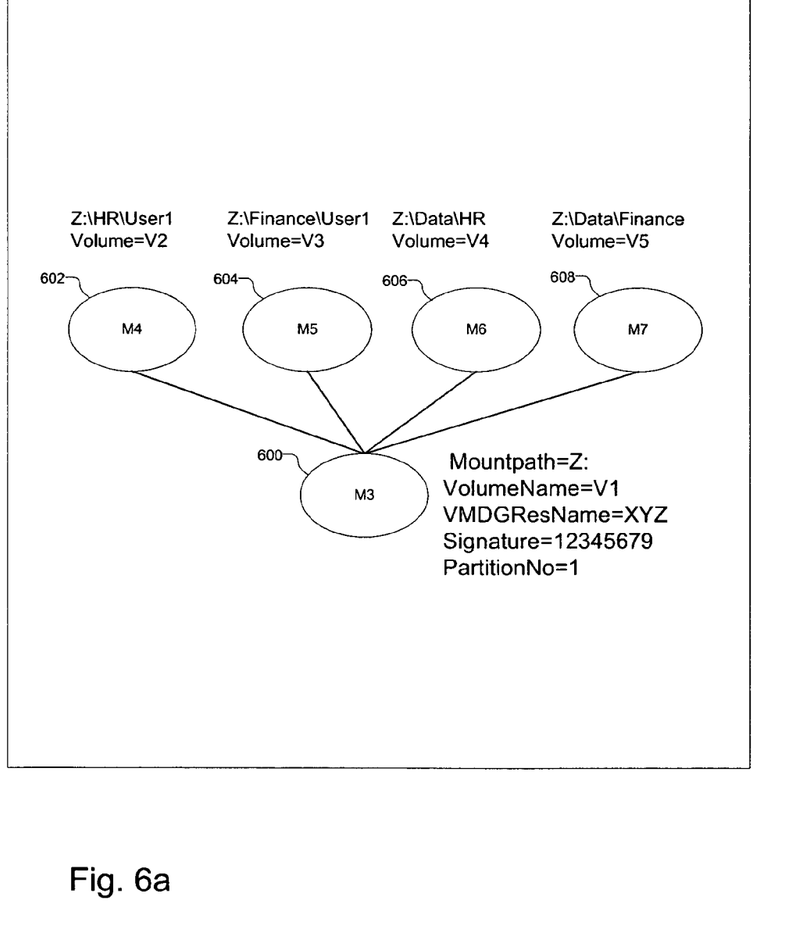
FIG. 6a illustrates a volume mount architecture for supporting volume chaining according to an embodiment of the present invention.
Figure 6B:
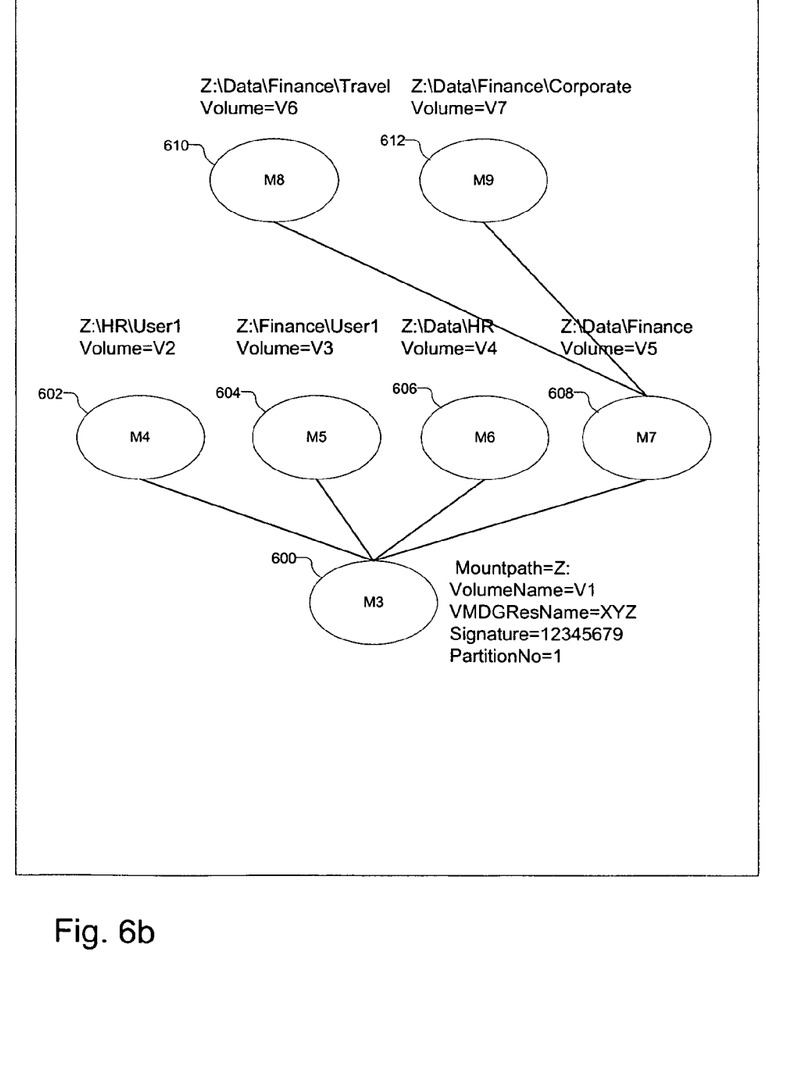
FIG. 6b illustrates a volume mount architecture for supporting multi-level volume mount points according to an embodiment of the present invention.

FIG. 6a illustrates a volume mount architecture for supporting volume chaining according to an embodiment of the present invention. In the illustrated embodiment, the above-described concept of providing support for a volume mount point within a cluster environment is extended to provide improved storage consolidation. While a specific exemplary embodiment will be described with respect to FIG. 6a and FIG. 6b, is should be appreciated that the embodiment is to be regarded in an illustrative rather than a limiting sense. Accordingly, the number of mounts, mount attributes, mount point locations, directory/folder names or "labels" etc. may each be varied in alternative embodiments of the present invention.

The illustrated embodiment of FIG. 6a includes a base mount 600 "M3" corresponding to a first volume "V1" and used for scaling and consolidating storage on a cluster within one or more volume mount point target mounts. In the illustrated embodiment base mount 600 comprises a "drive letter" type mount mounted as the drive letter "Z". First volume V1 resides on shared disk (or on cluster diskgroup) and includes three folders. Z:\Data, Z:\Finance and Z:\HR. Z:\Data in turn includes three sub folders; Z:\Data\common to store data common to the Finance and HR folders, Z:\Data\Finance to store sub folders per employee in the Finance department of a hypothetical company, and Z:\Data\HR to store sub folders per employee in the Human Resources (HR) department of the company.

According to one embodiment of the present invention storage is scaled while segregating data by configuring a first volume mount 602 "M4" on a volume "Fdata" to store Finance department data on Z:\Data\Finance, configuring a second volume mount 604 "M5" on a volume "Hdata" to store HR data on Z:\Data\HR, configuring a third volume mount 606 "M6" on a volume "FUser1" to store the user space of a first user within the Finance department on Z:\Finance\User1, and configuring a fourth volume mount 608 "M7" on a volume "HUser1" to store the user space of a the first user within the HR department on Z:\HR\User1. A mount order dependency relationship may then be defined between the various described mounts 600-608 such that M4 requires M3, M5 requires M3, M6 requires M3, and M7 requires M3.

Consequently, cluster-aware storage may be added for every user added to the Finance or HR departments of our hypothetical example simply by adding a new shared disk (or a new shared disk to an existing diskgroup), creating a filesystem on the disk, creating a directory for the user on Z:\HR or Z:\Finance, adding a VCS mount (e.g., a mount or mountv resource) including the new directory path as its mountpath attribute and either the new volume name or partition number and signature (for VM and LDM-configured disks, respectively), and defining the mount order dependency relationship such that the new target mount requires the base mount. New departments may be easily added using a similar process thus providing scalable and manageable storage.

FIG. 6b illustrates a volume mount architecture for supporting multi-level volume mount points according to an embodiment of the present invention. In addition to the base and target mounts 600-608 described with respect to FIG. 6a, the volume mount architecture of FIG. 6b further includes a fifth volume mount 610 "M8" on a volume (e.g., "Travel") and a sixth volume mount 612 "M9" on a volume (e.g., "Corporate") as shown. Similarly, the mount order dependency relationship described with respect o FIG. 6a is augmented such that M8 requires M7 and M9 requires M7.

Figure 7:
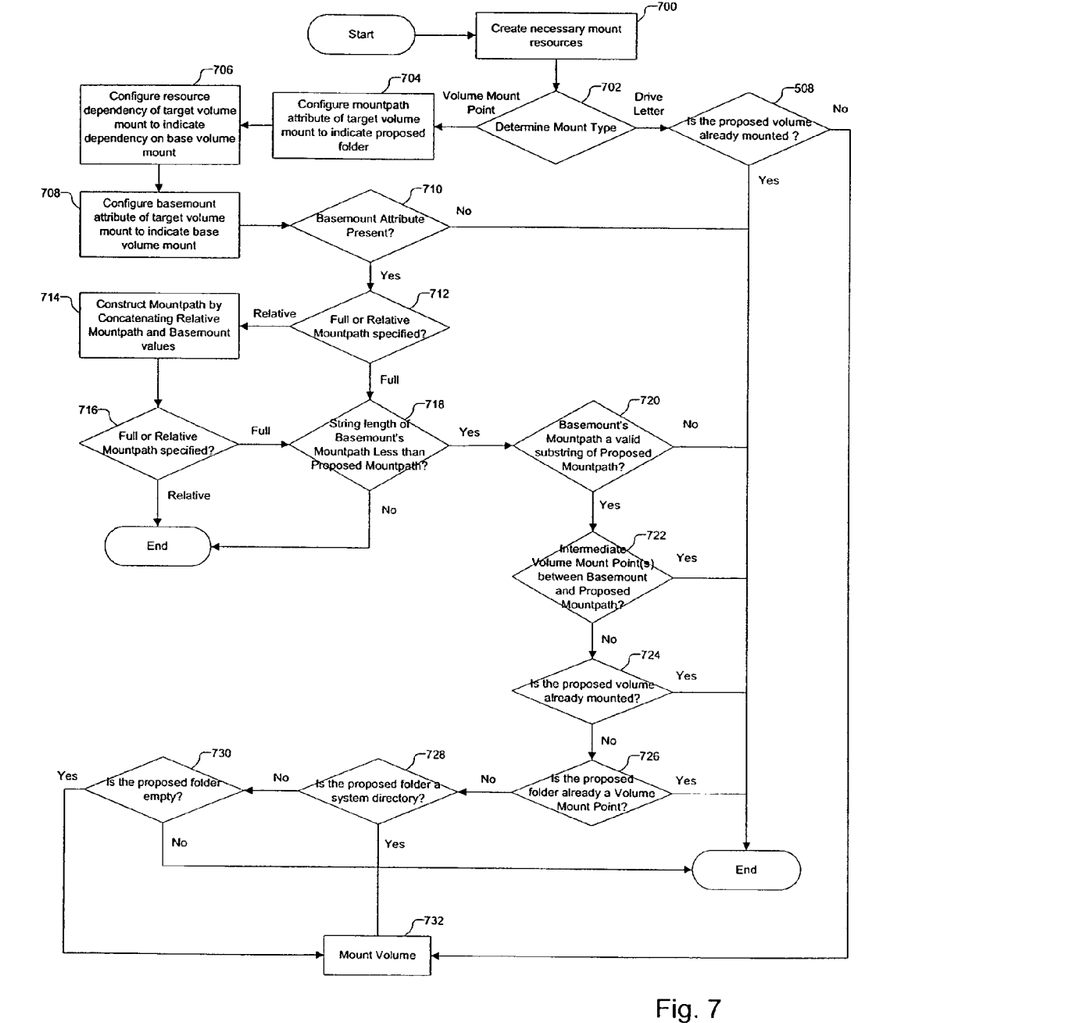
FIG. 7 illustrates a volume mount process using a base-mount volume mount attribute according to an embodiment of the present invention.

FIG. 7 illustrates a volume mount process using a basemount volume mount attribute according to an embodiment of the present invention. Supporting multi-level volume chaining as described above with respect to FIG. 6b requires proper enforcement of volume mount-order to ensure reliable access to data. According to one embodiment of the present invention, an additional "basemount" attribute is utilized to check the dependency of a volume mount rather than enumerating all dependencies through server cluster APIs to find a dependent base mount and its configuration.

In the illustrated process embodiment, resources necessary for providing the described volumes and mounts are first created (process block 700) and then a determination is made which mount type is to be performed (process block 702). If a volume mount point mount is to be performed, a mountpath attribute of a target volume mount is configured to indicate the proposed folder for the volume mount point (process block 704), the target volume mount's resource dependency is configured or defined to indicate the target volume mount's dependency on a base volume mount (process block 706), and a basemount attribute of the target volume mount is configured to indicate the base volume mount (process block 708).

According to the illustrated embodiment of FIG. 7, a determination is subsequently made whether a basemount attribute is present within a given volume mount (process block 710). If no basemount attribute is found, the illustrated process is terminated. Otherwise, a determination is made whether a full or relative mountpath attribute has been specified with respect to the volume mount (process block 712). If a relative mountpath has been specified, a new mountpath is constructed by concatenating relative mountpath and basemount values (process block 714). Once the new mountpath has been constructed, a determination is made whether the newly created mountpath is relative, in which case the described process is terminated. If it is determined that a full mountpath is specified in either case, a determination is then made whether the string length of the basemount's mountpath is less than that of the proposed mountpath (process block 718).

If a determination is made that the string length of the basemount's mountpath is greater than that of the proposed mountpath, the described process is terminated. Otherwise, a determination is made whether or not the basemount's mountpath comprises a valid substring of the proposed mountpath (process block 720) from the beginning. For example, valid basemount substrings of a proposed mountpath, Z:\User\John would include Z:, Z:\, and/or Z:\User. A determination is then made whether any intermediate volume mount points exist between the basemount and proposed mountpath folders (process block 722) (e.g., using a loop operation) in response to a determination that the basemount's mountpath comprises a valid substring of the proposed mountpath. If a determination is made that the basemount's mountpath does not comprise a valid substring of the proposed mountpath by contrast, the illustrated process is terminated as shown.

Thereafter determinations are made whether the proposed volume has already been mounted (process block 724), whether the proposed folder is already being used as a volume mount point (process block 726), whether the proposed folder is a system directory (process block 728), and whether the proposed folder is empty (process block 730). If a determination is made that the proposed volume is already mounted, or that the proposed folder is already a volume mount point, is a system directory, or isn't empty the illustrated process is terminated. Otherwise, the volume is mounted (process block 732) prior to the termination of the described process.

If a drive letter mount is to be performed, a determination is made whether the proposed volume has already been mounted (process block 734) either as a volume mount point or a drive letter. If a mount of the proposed volume already exists, the described process is terminated to avoid having multiple paths to or mounts of a single volume and to maintain a single point of control of storage resources within the server cluster. If a determination is made that no mount exists for the proposed volume, the volume is mounted (process block 732) and thereafter the illustrated process ends.

While a particular order of operation has been illustrated and described with respect to FIG. 7, it should be appreciated that in alternative embodiments of the present invention that the order of the depicted process elements may be varied and/or the process elements may be consolidated or separated into a greater or lesser number of elements as described herein with respect to FIG. 5.

In one embodiment of the present invention, one or more volume mount points and mounts are provided as described herein and used, following the detection of a transition (e.g., a failover or switchover) between nodes of a server cluster, to ensure that a new (secondary or "backup") node within a server cluster accesses a disk or volume in the same way it was accessed before a transition event.

In the described embodiment, a servicegroup is configured including a primary node and a secondary node (System1 and System2, respectively) as is a resource (DiskCntrl) to control shared storage resources (e.g., shared disks) such as a DiskRes (for basic disks) or VMDg (for dynamic disks) resource. If a DiskRes resource is configured, all disks on which Mount/MountV resources are going to be controlled are then configured. So for example, if a first disk includes a first volume and a second disk includes a second volume, then both the first and second disks are controlled by the DiskRes resource. Thereafter, a mount (or mountV) resource is configured to host a base mount (BaseMnt) and the basemount's dependency is defined such that BaseMnt requires DiskCntrl.

The BaseMnt resource is then brought online on System1 which includes bringing DiskCntrl online and subsequently mounting the BaseMnt volume (e.g., as the drive letter X). A directory or folder (Dir) may then be created on the BaseMnt volume on X and another mount (or mountV) resource may be configured to host a volume mount point target mount (FldrMnt) and the volume mount point target mount's dependency is defined such that FldrMnt requires BaseMnt. The FldrMnt resource may then be brought online on System1 by mounting the FldrMnt volume as X:\Dir.

A transition or migration of the described servicegroup may then be performed between System1 and System2 of the exemplary embodiment in the case of failover or switchover as follows. On System1 the FldrMnt resource is taken offline (e.g., by unmounting the FldrMnt volume and deleting the mount point at X:\Dir). The BaseMnt resource is then similarly taken offline (e.g., by unmounting the BaseMnt volume and deleting the drive letter mount X). Thereafter the DiskCntrl resource is taken offline (e.g., by relinquishing control of disks from System1). After all the described resources have been taken offline from System1, the process is performed in reverse on System2. The DiskCntrl resource is brought online on System2 to gain control of disks from System1, the BaseMnt resource is brought online, and then the FldrMnt resource is brought online such that the FldrMnt volume is accessed in exactly the same manner on System2 as it was on System1.

The foregoing detailed description has set forth various embodiments of the present invention via the use of block diagrams, process diagrams, and examples. It will be understood by those within the art that each block diagram component, process diagram block, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing or machine-accessible media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-accessible or computer-accessible storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a processor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
providing a volume mount point within a shared storage resource, wherein
said providing said volume mount point comprises configuring said volume mount point,
said shared storage resource is coupled to a server cluster, and
said shared storage resource is accessible by a node of said server cluster; and
mounting a volume on said volume mount point using said node of said server cluster, wherein
said shared storage resource comprises
a base volume, and
a target volume, and
said providing said volume mount point further comprises
providing a volume mount point associated with said target volume within said base volume.

2. The method of claim 1, wherein
said providing said volume mount point further comprises
configuring a mount corresponding to said target volume.

3. The method of claim 2, wherein
said configuring said mount corresponding to said target volume comprises
configuring a first mount corresponding to said target volume, and
associating said first mount with a second mount corresponding to said base volume.

4. The method of claim 3, wherein
said associating said first mount with said second mount further comprises
defining a mount order dependency relationship between said first mount and said second mount.

5. The method of claim 4, wherein
said mounting comprises
mounting said target volume on said volume mount point using said mount order dependency relationship.

6. The method of claim 5, wherein
said mounting said target volume on said volume mount point using said mount order dependency relationship comprises
mounting said base volume, and
mounting said target volume in response to said mounting of said base volume.

7. The method of claim 4, wherein
said server cluster comprises
a primary node, and
a secondary node, and
said mounting comprises
detecting a transition between said primary node and said secondary node, and
mounting said target volume on said volume mount point using said mount order dependency relationship in response to said detecting.

8. The method of claim 3, wherein
said associating said first mount with said second mount comprises
specifying a mountpath attribute for said first mount.

9. A machine-readable medium having a plurality of instructions executable by a machine embodied therein, wherein said plurality of instructions when executed cause said machine to perform a method comprising:
providing a volume mount point within a shared storage resource, wherein
said providing said volume mount point comprises configuring said volume mount point,
said shared storage resource is coupled to a server cluster, and
said shared storage resource is accessible by a node of said server cluster; and
mounting a volume on said volume mount point using said node of said server cluster, wherein
said shared storage resource comprises
a base volume, and
a target volume, and
said providing said volume mount point further comprises
providing a volume mount point associated with said target volume within said base volume.

10. The machine-readable medium of claim 9, wherein
said providing said volume mount point further comprises
configuring a mount corresponding to said target volume,
said configuring said mount corresponding to said target volume comprises
configuring a first mount corresponding to said target volume, and
associating said first mount with a second mount corresponding to said base volume.

11. The machine-readable medium of claim 10, wherein
said associating said first mount with said second mount further comprises
defining a mount order dependency relationship between said first mount and said second mount.

12. The machine-readable medium of claim 11, wherein
said mounting comprises
mounting said target volume on said volume mount point using said mount order dependency relationship.

13. The machine-readable medium of claim 11, wherein
said server cluster comprises
a primary node, and
a secondary node, and
said mounting comprises
detecting a transition between said primary node and said secondary node, and
mounting said target volume on said volume mount point using said mount order dependency relationship in response to said detecting.

14. A system comprising:
a shared storage resource comprising
a base volume, and
a target volume, wherein
said base volume comprises a volume mount point associated with said target volume; and
a server cluster coupled to said shared storage resource, wherein
said shared storage resource is accessible by a node of said server cluster,
said shared storage resource is configured to provide said node access to said volume mount point,
said node is configured to mount a volume on said volume mount point said shared storage resource is configured to provide said node access to said volume mount point by virtue of being configured to provide providing a volume mount point associated with said target volume within said base volume.

15. A system comprising:

means for providing a volume mount point associated with a target volume within a base volume within a shared storage resource, wherein
 said means for providing said volume mount point comprises means for configuring said volume mount point,
 said shared storage resource is coupled to a server cluster, and
 said shared storage resource is accessible by a node of said server cluster; and means for mounting a volume on said volume mount point using said node of said server cluster, wherein
 said shared storage resource comprises
  a base volume, and
  a target volume, and
 said means for providing said volume mount point further comprises
  means for providing a volume mount point associated with said target volume within said base volume.

16. The system of claim 15 wherein
said means for providing said volume mount point further comprises
 means for configuring a mount corresponding to said target volume, and
said means for configuring said mount corresponding to said target volume comprises
 means for configuring a first mount corresponding to said target volume, and
 associating said first mount with a second mount corresponding to said base volume.

17. The system of claim 16, wherein
said means for associating said first mount with said second mount further comprises
 means for defining a mount order dependency relationship between said first mount and said second mount.

18. The system of claim 17, wherein
said means for mounting comprises
 means for mounting said target volume on said volume mount point using said mount order dependency relationship.

19. The system of claim 17, wherein
said server cluster comprises
 a primary node, and
 a secondary node, and
 said means for mounting comprises
  means for detecting a transition between said primary node and said secondary node, and
  means for mounting said target volume on said volume mount point using said mount order dependency relationship in response to said detecting.

* * * * *